June 13, 1961  P. DOTTER  2,988,186
DEVICE FOR DISENGAGING RATCHET GEARS
Filed June 4, 1959

INVENTOR
Paul Dotter
By Richard Low
Ag't

United States Patent Office 2,988,186
Patented June 13, 1961

2,988,186
DEVICE FOR DISENGAGING RATCHET GEARS
Paul Dotter, Schweinfurt (Main), Germany, assignor to Fichtel & Sachs A.G., Schweinfurt (Main), Germany, a corporation of Germany
Filed June 4, 1959, Ser. No. 818,025
Claims priority, application Germany June 6, 1958
8 Claims. (Cl. 192—47)

This invention relates to devices for disengaging the pawls of ratchet gears, and more particularly to a device for disengaging the pawls of the ratchet drive gear connected with the chain wheel of a three-speed rear wheel hub for a bicycle, the hub being equipped with two ratchet gears.

When operating a bicycle equipped with a three-speed hub of the type described, the necessity sometimes arises of disengaging the spring-biased pawls of the ratchet drive gear connected to the chain wheel, and customarily mounted on the right side of the hub, and of doing so regardless of the prevailing relative speeds of the driving and the driven member of the ratchet gear. When a bicycle equipped with a three-speed hub with two ratchet gears is operated in low gear, the hub shell rotates more slowly than the chain wheel with the drive ring, the pawl ring, and the internally toothed annular wheel of the planetary gear, namely at the speed of the planet carrier. Power is transmitted from the planet carrier to the hub shell by the other ratchet gear mounted in the hub remote from the chain wheel, that is, customarily, on the left side of the hub as seen in the direction of forward movement of the bicycle. For the sake of clarity, the two ratchet gears of the three-speed bicycle hub will be referred to hereafter as the right and the left ratchet gear, it being understood that the right ratchet gear is the one directly connected to the chain wheel at normal speed of operation.

When the bicycle is operated in low gear as described above, the right ratchet gear would prevent rotation of the hub shell at a lower speed than that of the chain wheel if its pawls could not be disengaged in some manner during low speed operation.

The problem is well known and various devices have been proposed in the past which are intended to automatically disengage the right ratchet gear of a three-speed hub of the type described when the hub is switched from normal or intermediate speed to low speed. These known devices are relatively complex in design, require maintenance of rather exacting manufacturing tolerances and are accordingly costly to produce. Because of their intricate nature, they are also relatively sensitive and may require frequent adjustment and replacement of parts subject to wear.

It is the primary object of this invention to provide a device for disengaging the ratchet drive gear of a three-speed hub of the type described which is of simple structure.

Another object is the provision of such a device which can be inexpensively produced in large quantities at very low cost.

A further object is the provision of such a device which is relatively rugged and capable of prolonged reliable service without maintenance or requiring but a minimum of maintenance operations.

With these and other objects in view, the invention provides in a device of the type described a ratchet wheel and pawl ring means concentrically rotatable relative to each other about an axis. A pawl is mounted on the pawl ring means and is movable thereon between a projecting and a retracted position, the pawl being urged into the projected position by resilient means and having, when in the projected position, an edge portion extending transversely of the axis. A control element which has a face portion inclined relative to the axis may be axially moved relative to the pawl ring means for engagement of the face portion thereof with the edge portion of the pawl for moving the pawl towards the retracted position thereof and for disengaging it from the ratchet wheel.

In its more specific aspects, the ratchet gear-disengaging device of the invention provides a control element which may be a sheet metal stamping and is axially movable on a hub portion of the annular internally toothed wheel of the planetary gear, the hub portion facing the chain wheel. When the three-speed hub is shifted from normal speed to low speed, that is, when the striking gear in the hub moves axially towards the chain wheel, the control element is moved by the striking gear towards the chain wheel. The control element of the invention has a conical face portion, and preferably an annular conical lip portion which engages suitable extensions of the pawls and thus disengages the pawls from the ratchet wheel.

When the three-speed hub is shifted back from low speed to normal speed, the control element together with the striking gear is moved back toward the center of the hub by a return spring. The pawls are thereby released by the conical face portion of the control element and again engage the ratchet wheel under the force of their pawl springs so as to connect the pawl ring with the ratchet wheel, and thereby with the hub shell.

The exact nature of the invention as well as other objects and advantages thereof will be readily apparent from consideration of the following specification relating to the annexed drawing in which.

Figure 1:
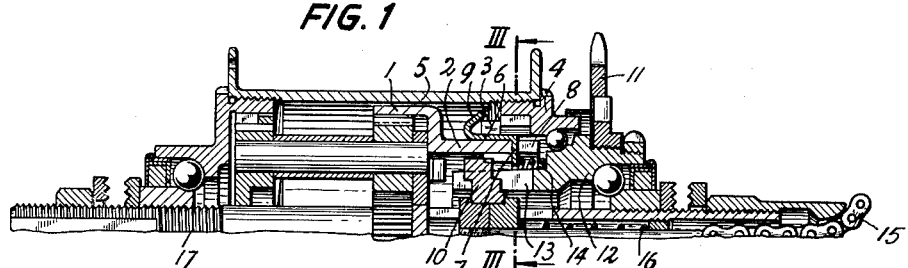
FIG. 1 shows a fragmentary view of a three-speed bicycle hub equipped with the device of the invention, the hub being shown in axial section and arranged for operation at normal speed.
Figure 3:
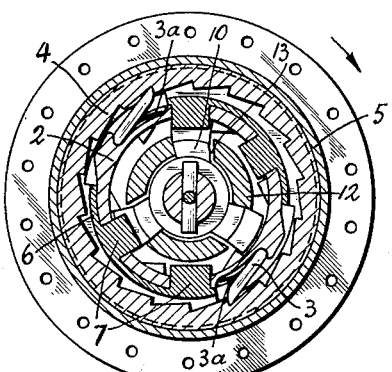
FIG. 3 is a cross sectional view of the hub of FIG. 1 taken on the line III—III.

Referring now to the drawing and more particularly to FIGS. 1 and 3, there is shown a three-speed hub for the rear wheel of a bicycle. The hub is of the well known type in which the three speeds of transmission are achieved by planetary gearing and by two ratchet gears. One half of an axially sectional view is shown in FIG. 1, it being understood that the other half is substantially a mirror image of what is shown in FIG. 1.

The annular, internally toothed wheel 1 of the planetary gear of the three-speed hub has an integral tubular cylindrical extension portion 2 which serves as a pawl ring for the right driving ratchet gear of the three-speed hub. The left ratchet gear is also shown together with the other elements of the planetary gearing, the ball bearings with their balls, cones and cups, which form races for the balls, the internal elements of the striking gear, and the split spindle 17 on which the hub rotates and which is secured to the rear fork of a bicycle by means of nuts. These elements being well known and not part of the subject matter of this invention are not further described.

The pawl carrier 2 is equipped with two pivotally mounted pawls 3, only one of which appears in FIG. 1, but which are better seen in FIG. 3 which also shows pawl springs 3a urging the pawls radially outward from the pawl ring 2. The pawls cooperate with a ratchet wheel 4 which is threadedly secured to the hub shell 5.

Figure 5:
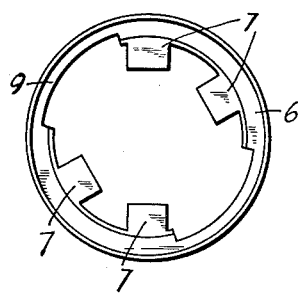
FIG. 5 is a plan view of the control element of the invention.

A control element 6 is axially movable on the pawl carrier portion 2 of the annular planetary wheel 1. As best seen from FIG. 5, the control element 6 is of substantially tubular shape, the internal diameter of the element being slightly larger than the outer diameter of the corresponding pawl ring on which the element 6 is slidably mounted. Lugs 7 project radially inward from one end of the element 6 and engage mating guide slots 8 in the pawl carrier 2. The cylindrical portion of the element 6 is partially cut away to facilitate assembly and to provide clearance for other cooperating portions of the hub. The other end of the control element 6 is flanged to form a conical annular lip 9, the open base of the conus defined by the lip 9 facing the pawls 3. As best seen in FIG. 1, a portion of each pawl 3 projects axially beyond the ratchet wheel 4 towards the control element 6 and the conical inner surface of the lip 9 extends radially outward beyond the outer edge of the projecting portion of the pawl 3.

The lugs 7 of the control element 6 extend radially inward through the full thickness of the pawl ring 2 and project inwardly therefrom into the path of travel of an entraining ring 10 which is part of the striking gear of the three-speed hub. The ring 10 is urged into the position shown in FIG. 1 by a return spring 16 and is connected to a chain 15 which is under the control of the rider and by means of which the striking gear in the hub can be displaced towards the chain wheel in a well known manner.

The ring 10 is guided in guide slots 13 provided in the drive ring 12 which is fixedly connected to the chain wheel 11. The drive ring 12 rotatably carries the ratchet wheel 4 and the hub shell 5, and is itself rotatably mounted on one portion of the split spindle 17. When the chain 15 is pulled, the axially moving entraining ring 10 abuts against the lugs 7 and forces the control element 6 to slide on the pawl ring 2 in an axial direction toward the chain wheel 11, thereby compressing the springs 14. When the tension on the chain 15 is released, the entraining ring 10 is returned to the position shown in FIG. 1 by the spring 16, and the control element 6 resumes its first position under the urging of the springs 14.

Figure 2:
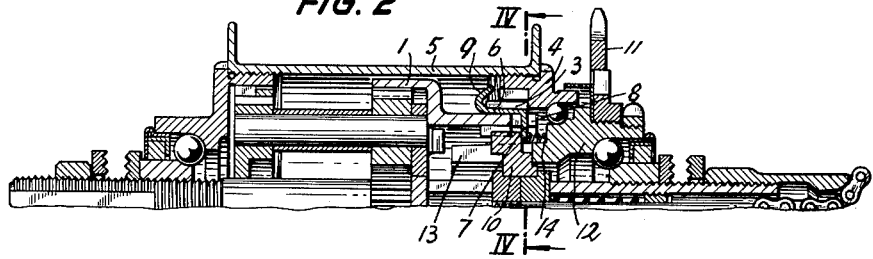
FIG. 2 shows the device of FIG. 1 arranged for low speed operation.
Figure 4:
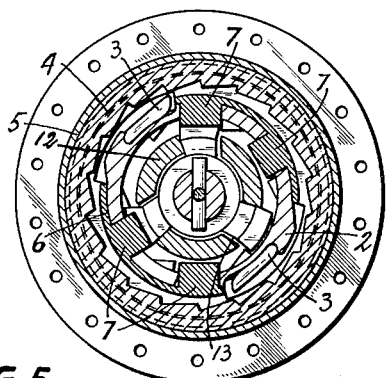
FIG. 4 is a cross sectional view of the hub of FIG. 2 taken on the line IV—IV.

Displacement of the control element 6 from the position illustrated in FIGS. 1 and 3 into that shown in FIGS. 2 and 4 causes pivoting of the pawls 3 by the conical lip 9 of the control element against the restraint of the springs 3a. The engaging edges of the pawls are thus withdrawn from the ratchet wheel 4, as best seen in FIG. 4, and the ratchet wheel, together with the hub shell 5, is free to rotate at a speed slower than that of the chain wheel 11 and of the hub elements connected thereto for joint movement.

When the hub is again shifted to normal speed operation, and the control element 6 is moved back towards the center of the hub, the pawls 3 are released by the conical lip 9 and are pivoted outward by their springs 3a so that they engage the teeth of the ratchet wheel 4. The ratchet wheel, and therefore the hub shell 5, now must rotate at the same speed as the chain wheel, the usual condition for normal speed operation.

The control element 6 may be manufactured in any desired manner, but it has been found that such a basically tubular shape can be speedily and inexpensively produced to close dimensional tolerances by punching operations on a power press. Because of the relative arrangement of the conrtol element and of the other members of the hub, the control element may be made from relatively heavy sheet metal blanks and is therefore very sturdy and insensitive to the wear to which it is subjected. The conically flanged lip and the radially extending lugs substantially contribute to the rigidity of the structure and to the permanence of its shape.

Obviously, many modifications and variations of the present invention are possible in the light of the above teachings. It is, therefore, to be understood that within the scope of the appended claims, the invention may be practiced otherwise than as specifically disclosed.

I claim:
1. In a device for disengaging a ratchet gear, in combination, a ratchet wheel; pawl ring means concentrically rotatable relative to said ratchet wheel about an axis; a pawl mounted on said pawl ring means and movable thereon between a projecting position and a retracted position; resilient means urging said pawl into said projecting position for engagement with said ratchet wheel, said pawl, when in the projecting position, having an edge portion extending transversely of said axis; a control element having a face portion inclined relative to said axis; and means for axially moving said control element relative to said pawl ring means for engagement of the face portion thereof with said edge portion of said pawl for moving said pawl towards the retracted position thereof and for disengaging the same from said ratchet wheel.

2. In a device as set forth in claim 1, said pawl being movable in a radial direction between a projecting position and a retracted position.

3. In a device as set forth in claim 2, said pawl being pivotally movable.

4. In a device as set forth in claim 1, said face portion being of conical shape, the conus being substantially coaxial with said ratchet wheel and said pawl ring means.

5. In a device as as set forth in claim 4, said face portion being of annular conical shape.

6. In a device as set forth in claim 5, said control element being of unitary sheet material structure.

7. In a device for disengaging the ratchet gear of a multi-speed bicycle hub, in combination, a ratchet wheel; pawl ring means concentrically rotatable relative to said ratchet wheel about an axis; a pawl mounted on said pawl ring means and movable thereon between a projecting position and a retracted position; resilient means urging said pawl into said projecting position for engagement with said ratchet wheel, said pawl, when in the projecting position, having an edge portion extending transversely of said axis; a control element having a face portion inclined relative to said axis; and striking gear axially movable relative to said ratchet wheel and to said pawl ring and engageable with said control element for joint movement therewith for engagement of said face portion with said edge portion of said pawl for moving said pawl toward the retracted position thereof and for disengaging the same from said ratchet wheel.

8. In a device for disengaging a ratchet gear, in combination, a ratchet wheel; pawl ring means concentrically rotatable relative to said ratchet wheel about an axis; a pawl mounted on said pawl ring means and movable thereon between a projecting position and a retracted position, said pawl when in the projecting position engaging said ratchet wheel and having an edge portion; a control element having a face portion, one of said portions being inclined relative to said axis, and the other one of said portions extending transversely of said axis; and means for axially moving said control element relative to said pawl ring means for engagement of said face portion thereof with said edge portion of said pawl for moving said pawl in a direction from said projecting toward said retracted position thereof.

References Cited in the file of this patent

UNITED STATES PATENTS

| | | |
|---|---|---|
| 1,737,907 | Arnold | Dec. 3, 1929 |
| 2,143,121 | Cox | Jan. 10, 1939 |
| 2,917,145 | Ferris et al. | Dec. 15, 1959 |